United States Patent
Leibecki

[15] 3,666,741
[45] May 30, 1972

[54] ELECTRICALLY CONDUCTIVE FLUOROCARBON POLYMER

[72] Inventor: Harold F. Leibecki, Parma, Ohio

[73] Assignee: The United States of America as represented by the Administrator of the National Aeronautics and Space Administration

[22] Filed: Jan. 22, 1970

[21] Appl. No.: 5,114

Related U.S. Application Data

[63] Continuation-in-part of Ser. No. 631,847, Apr. 17, 1967, abandoned.

[52] U.S. Cl.............................260/92.1, 117/132, 117/161, 260/2.5
[51] Int. Cl.......................C08f 3/24, C08f 3/26, C08f 3/28
[58] Field of Search...............................260/92.1 S

[56] References Cited

UNITED STATES PATENTS 2,865,795  12/1958  Morrison.........................260/92.1 S

OTHER PUBLICATIONS

Lopez, Chem. Abs. 62 (1965) pp. 1816 d
Chem. Abs., Subject Index, 62 (1965) p. 1072 S, Column 2, Line 60

Primary Examiner—Harry Wong, Jr.
Attorney—N. T. Musial, G. E. Shook and G. T. McCoy

[57] ABSTRACT

Fluorocarbon polymers are impregnated with rhenium or molybdenum by immersion in liquid rhenium hexafluoride or molybdenum hexafluoride. The rhenium and molybdenum fluoride compounds are then hydrolyzed to form conductive oxides. The impregnated polymer is electrically conductive.

7 Claims, No Drawings

ELECTRICALLY CONDUCTIVE FLUOROCARBON POLYMER

REFERENCE TO RELATED PATENTS

This application is a continuation-in-part of U.S. Pat. application Ser. No. 631,847 filed Apr. 17, 1967, now abandoned.

STATEMENT OF GOVERNMENT OWNERSHIP

The invention described herein was made by an employee of the United States Government and may be manufactured and used by or for the Government of the United States of America for governmental purposes without the payment of any royalties thereon or therefor.

BACKGROUND OF THE INVENTION

This invention relates to electrically conductive fluorocarbon polymers and methods of impregnating such polymers with metal fluoride compounds. More particularly the invention is directed to impregnating polymers with rhenium or molybdenum containing compounds to produce electrical conductivity.

Fluorocarbon polymers are well known. They are extremely stable over a wide temperature range, are relatively impervious to chemical attack, are normally non-wettable, and have a low co-efficient of friction. Because such polymers are relatively inert, they find considerable use, especially in the form of coatings, in environments where articles must be protected from chemical attack.

Polymers of fluorinated ethylene, such as polytetrafluoroethylene (PTFE), are also dielectric materials, a characteristic that has resulted in their wide application in the electrical and electronic industry. However, this is a disadvantageous characteristic for many uses. For example, in an electrochemical cell, it is desirable to protect the electrode from chemical attack, as with a coating. A Teflon (polytetrafluoroethylene) coating would be especially desirable in such an application, and would result in cell life not presently obtainable. However, a dielectric coating is not satisfactory for such use. In other instances, where Teflon has been used either to form an article or to coat materials as protection against chemical attack, the hazard created by the possible build up of a static electric charge by associated parts or by the base material has often proven dangerous. For example, in operating rooms of hospitals combustible anesthetics are used. Possible electrostatic sparking creates a hazard that makes it undesirable to use equipment and parts or instruments that are not electrically conductive so that electrostatic charges may be grounded.

Attempts have been made in the past to overcome the dielectric properties of polymers, including Teflon, primarily by imbedding particles of conductive material within the polymer. See, for example, U.S. Pat. Nos. 3,070,132 and 3,166,688. The use of a dispersion of conductive material or the incorporation of strips of conductive material in a formed product presents serious problems of fabrication and in general are not entirely satisfactory.

SUMMARY OF THE INVENTION

In accordance with this invention, fluorocarbon polymer is made electrically conductive by impregnating the polymer with rhenium or molybdenum in the form of rhenium hexaflouride or molybdenum hexafluoride after which conductive oxides of the metals are formed by hydrolyzing the metal compound. The treatment is applicable to an article coated with a fluorocarbon polymer or to the bulk polymer.

After the polymer has been impregnated, it is subjected to a water vapor containing atmosphere or a water bath to oxidize the rhenium or molybdenum. The material may then be heated to approximately 250° Centigrade if desired. The resulting product is especially useful where the inertness of such polymers is needed but where electrical conductivity is required, as where static electricity must be removed or in an electrochemical cell. The material can be used as an electrode coating or in porous form as the electrode itself in an electrochemical cell and will result in cell life not presently obtainable. Base materials coated with this material do not build up static electric charges and accordingly may be used in such environments such as hospital operating rooms where otherwise there would be extreme danger from explosive atmosphere.

DESCRIPTION OF THE PREFERRED EMBODIMENTS

A fluorocarbon polymer having dielectric properties is made conductive by immersing it in pure liquid rhenium hexafluoride or molybdenum hexafluoride. This is preferably done at ambient temperatures. The immersion duration depends upon the depth of penetration desired. Normally, the immersion will be for a period of time from one hour to as long as 24 hours or more, a typical time being approximately 3 hours to permit diffusion of the rhenium or molybdenum hexafluoride to proceed to a depth of several mils. A penetration of from 2 or 3 mils to one-sixteenth of an inch is normally sufficient to provide satisfactory electrically conductive characteristics. Such penetration would extend completely through coatings of conventional thicknesses and would provide surface conductivity to articles of solid polymer. The time required for penetration in any desired depth may be readily determined by immersing various polymer samples of known thicknesses in the liquid rhenium hexafluoride or molybdenum hexafluoride until the material has diffused through the sample.

After the rhenium hexafluoride or molybdenum hexafluoride has penetrated to the desired depth, the polymer is subjected to a water vapor containing atmosphere or water bath, i.e., a hydrolyzing environment, after which the polymer may be heated to approximately 250° Centigrade. The moist atmosphere includes air having at least a 20 percent relative humidity as well as any gas which will not react with the hexafluorides but which contains water vapor. Only a relatively short period of heating time is required for thin coatings or thin polymer articles, while a substantial period of time is required for bulk samples. The polymer is now electrically conductive.

When the impregnated polytetrafluoroethylene is subjected to the moist air or water bath, it is believed that oxides of rhenium or molybdenum are formed ($Re_2O_3$ or $MoO_2$) and that the conductivity of the finished article results from this formation of rhenium or molybdenum oxide.

The presence of rhenium or molybdenum that has penetrated into the polytetrafluoroethylene can be determined by spectrographic analysis. X-ray diffraction shows $Re_2O_3$ lines in samples of polytetrafluoroethylene that has been immersed in liquid rhenium hexafluoride.

The invention is further illustrated by the following examples of procedures for producing electrically conductive polytetrafluoroethylene, included for illustration only and not by way of limitation.

EXAMPLE I

A Teflon (polytetrafluoroethylene) sample 5 mils in thickness, 1 square centimeter in area, initially white in appearance, electrically nonconductive, and having a density of 2.15 grams per cubic centimeter is immersed in pure liquid rhenium hexafluoride ($ReF_6$) at ambient temperature (approximately 68° Fahrenheit). After 3 hours the rhenium hexafluoride is diffused through the 5 mil thickness, and the sample is removed from the liquid rhenium hexafluoride. The sample is then immersed in a water bath for several minutes at ambient temperatures, is removed, and heated to 250° Centigrade for several minutes in an oven. The temperature of the water bath may range from 25° to 200° C with approximately 100° C being preferred. The previously white material takes on a black appearance and is now electrically conductive. The measured conductivity through the 5 mil sample is 100 ohms per square centimeter. Conductivity was measured by placing a 1 square centimeter metal foil with each 1 square centimeter surface of the impregnated sample and measuring the resistance between the foils.

EXAMPLE II

Example I is repeated, but the polytetrafluoroethylene sample is immersed in pure liquid molybdenum hexafluoride ($MoF_6$). The resulting estimated conductivity of the polytetrafluoroethylene sample is 100 ohms per square centimeter for the 5 mil thick sample.

EXAMPLE III

Chlorotrifluoroethylene samples were immersed for about 3 hours in liquid rhenium hexafluoride at ambient temperature (about 68° F) and then hydrolyzed in air at ambient temperature. The samples are then electrically conductive.

EXAMPLE IV

Example III is repeated using vinylidene fluoride samples immersed for about 90 hours in the rhenium hexafluoride. The samples are then conductive.

EXAMPLE V

Example III is repeated using fluorinated ethylene propylene samples. The samples are then conductive.

The actual conductivity of fluorocarbon polymers will vary with the size, shape and degree of impregnation. For example, a value of 173 ohm-centimeter was obtained by measuring the resistance between a pair of metal foils placed in contact with opposite sides of a 1 centimeter cube of polytetrafluoroethylene impregnated with rhenium hexafluoride to a depth of approximately 4 mils on all surfaces. Also, a much greater conductivity than 100 ohms per square centimeter for a 5 mil thickness of polytetrafluoroethylene will result by using a spongy type of material.

In addition, while two preferred fluorides, namely rhenium hexafluoride and molybdenum hexafluoride have been found to produce the desired electrical conductivity in representative fluorocarbon polymers, it is contemplated that other fluorocarbon polymers will similarly be made conductive in the manner described above and that other metals with rhenium or molybdenum hexafluoride will penetrate fluorocarbon polymers to impart electrical conductivity.

While preferred embodiments of this invention have been disclosed with particularity, it will be understood that various modifications or alterations may be made therein without departing from the spirit or scope of the invention, as set forth in the appended claims.

What is claimed is:

1. A method of producing an electrically conductive fluorocarbon polymer comprising the steps of:
   a. immersing a fluorocarbon polymer in a liquid metal fluoride compound selected from the group consisting of rhenium hexafluoride and molybdenum hexafluoride for a time sufficient to allow penetration by the liquid into the polymers, and
   b. hydrolyzing the metal fluoride compound.

2. The method of claim 1 wherein the fluorocarbon polymer is selected from the group consisting of polytetrafluoroethylene, chlorotrifluoroethylene, vinylidene fluoride and fluorinated ethylene propylene.

3. The method of claim 1 wherein the hydrolyzing is accomplished by subjecting the polymer to a water bath.

4. The method of claim 3 wherein the water bath temperature is approximately 100° C.

5. The method of claim 3 and including the additional step of heating the polymer to approximately 250° C.

6. The method of claim 1 wherein the hydrolyzing is accomplished by disposing the polymer in a water vapor containing gas.

7. The method of claim 1 wherein the polymer is of the spongy type.

* * * * *